(12) United States Patent
Brunner et al.

(10) Patent No.: US 10,287,407 B2
(45) Date of Patent: May 14, 2019

(54) SURFACE-TREATED FILLERS FOR BREATHABLE FILMS

(71) Applicant: Omya International AG, Oftringen (CH)

(72) Inventors: Martin Brunner, Wallbach (CH); René Burkhalter, Herzogenbuchsee (CH); Tazio Fornera, Zofingen (CH); Samuel Rentsch, Spegel bei Bern (CH); Michael Tinkl, Gipf-Oberfrick (CH); Francesco Pullega, Bologna (IT); Monroe Moore, South Burlington, VT (US)

(73) Assignee: Omya International AG, Oftringen (CH)

(*) Notice: Subject to any disclaimer, the term of this patent is extended or adjusted under 35 U.S.C. 154(b) by 35 days.

(21) Appl. No.: 15/502,537

(22) PCT Filed: Aug. 12, 2015

(86) PCT No.: PCT/EP2015/068520
§ 371 (c)(1),
(2) Date: Feb. 8, 2017

(87) PCT Pub. No.: WO2016/023937
PCT Pub. Date: Feb. 18, 2016

(65) Prior Publication Data
US 2017/0218148 A1    Aug. 3, 2017

Related U.S. Application Data

(60) Provisional application No. 62/039,967, filed on Aug. 21, 2014.

(30) Foreign Application Priority Data

Aug. 14, 2014 (EP) .................................. 14181082

(51) Int. Cl.
| | | |
|---|---|---|
| C08J 5/18 | (2006.01) | |
| B29C 48/02 | (2019.01) | |
| C09C 1/02 | (2006.01) | |
| C08K 9/04 | (2006.01) | |
| C08K 3/26 | (2006.01) | |
| B29C 48/08 | (2019.01) | |
| B29C 48/00 | (2019.01) | |
| B29K 101/12 | (2006.01) | |
| B29K 509/00 | (2006.01) | |

(52) U.S. Cl.
CPC ............. *C08J 5/18* (2013.01); *B29C 48/022* (2019.02); *C08K 3/26* (2013.01); *C08K 9/04* (2013.01); *C09C 1/021* (2013.01); *B29C 48/0018* (2019.02); *B29C 48/08* (2019.02); *B29K 2101/12* (2013.01); *B29K 2509/00* (2013.01); *C01P 2004/51* (2013.01); *C01P 2004/61* (2013.01); *C01P 2004/62* (2013.01); *C01P 2006/12* (2013.01); *C01P 2006/82* (2013.01); *C08J 2323/06* (2013.01); *C08J 2323/08* (2013.01); *C08J 2423/06* (2013.01); *C08K 2003/265* (2013.01); *C08K 2201/003* (2013.01); *C08K 2201/006* (2013.01)

(58) Field of Classification Search
CPC ...... C08J 5/18; C08J 2323/06; C08J 2423/06; C08K 9/04; C08K 3/26; C08K 2201/003; C08K 2201/006; C08K 2003/265; B29C 47/0004; B29C 47/0021; B29C 47/0057; C08P 2004/51; C08P 2004/61; C08P 2004/62; C08P 2006/12; C08P 2006/82; B29K 2101/12; B29K 2509/00; C09C 1/021
USPC .......................................................... 524/112
See application file for complete search history.

(56) References Cited

U.S. PATENT DOCUMENTS

| | | | | |
|---|---|---|---|---|
| 4,328,041 A | * | 5/1982 | Wilson ...................... | C09C 3/08 106/429 |
| 4,407,986 A | | 10/1983 | Nomura et al. | |
| 4,472,328 A | * | 9/1984 | Sugimoto .................. | C08J 5/18 264/41 |
| 4,520,073 A | | 5/1985 | Randolph et al. | |
| 4,876,152 A | | 10/1989 | Kang | |
| 5,135,967 A | | 8/1992 | Kumann et al. | |
| 6,569,527 B1 | * | 5/2003 | Calhoun .................... | C08J 5/18 264/145 |
| 7,300,974 B2 | | 11/2007 | Blanchard et al. | |
| 9,012,554 B2 | | 4/2015 | Saunders et al. | |

(Continued)

FOREIGN PATENT DOCUMENTS

| | | |
|---|---|---|
| DE | 958830 C | 2/1957 |
| EP | 0066672 A2 | 12/1982 |

(Continued)

OTHER PUBLICATIONS

International Search Report dated Dec. 10, 2015 for PCT/EP2015/068520.

(Continued)

*Primary Examiner* — Michael Bernshteyn
(74) *Attorney, Agent, or Firm* — Amster, Rothstein & Ebenstein LLP

(57) ABSTRACT

The present invention relates to a breathable film comprising at least one thermoplastic polymer and a surface-treated filler material product comprising a treatment layer comprising at least one mono-substituted succinic anhydride and/or at least one mono-substituted succinic acid and/or salty reaction product(s) thereof, a process for producing the same, and the use thereof. Furthermore, the present invention is directed to the use of a surface-treated filler material product comprising a treatment layer comprising at least one mono-substituted succinic anhydride and/or at least one mono-substituted succinic acid and/or salty reaction product(s) thereof in breathable films.

24 Claims, No Drawings

(56) References Cited

U.S. PATENT DOCUMENTS

| | | |
|---|---|---|
| 2002/0102404 A1 | 8/2002 | Nakai et al. |
| 2004/0097616 A1 | 5/2004 | Hoppler et al. |
| 2004/0162376 A1 | 8/2004 | Blanchard et al. |
| 2006/0148930 A1 | 7/2006 | Blanchard et al. |
| 2007/0256598 A1 | 11/2007 | Blanchard et al. |
| 2009/0227721 A1 | 9/2009 | Blanchard et al. |
| 2009/0324979 A1* | 12/2009 | Roussel .................. B32B 7/02 428/523 |
| 2011/0100575 A1 | 5/2011 | Schmidt-Thuemmes et al. |
| 2011/0245396 A1 | 10/2011 | Blanchard et al. |
| 2012/0031576 A1 | 2/2012 | Gane et al. |
| 2015/0240056 A1* | 8/2015 | Rentsch .................. C09C 1/021 442/327 |

FOREIGN PATENT DOCUMENTS

| | | |
|---|---|---|
| EP | 0325114 A2 | 7/1989 |
| EP | 1980588 A1 | 10/2008 |
| EP | 2070991 A1 | 6/2009 |
| EP | 2159258 A1 | 3/2010 |
| EP | 2264108 A1 | 12/2010 |
| EP | 2264109 A1 | 12/2010 |
| EP | 2722368 A1 | 4/2014 |
| GB | 2336366 A | 10/1999 |
| JP | 54-162746 A | 12/1979 |
| WO | 92/02587 A1 | 2/1992 |
| WO | 9961521 A1 | 12/1999 |
| WO | 0020336 A1 | 4/2000 |
| WO | 0132787 A1 | 5/2001 |
| WO | 03/0872066 A1 | 10/2003 |
| WO | 2005075353 A1 | 8/2005 |
| WO | 2008077156 A2 | 6/2008 |
| WO | 2009074492 A1 | 6/2009 |
| WO | 2009094321 A1 | 7/2009 |
| WO | 2011028934 A1 | 3/2011 |
| WO | 2011/124564 A1 | 10/2011 |
| WO | 2012052778 A1 | 4/2012 |
| WO | 2013/061068 A1 | 5/2013 |
| WO | 2014060286 A1 | 4/2014 |

OTHER PUBLICATIONS

Written Opinion of International Searching Authority dated Dec. 10, 2015 for PCT/EP2015/068520.
Hu et al., "Superhydrophobic Surface Fabricated from Fatty Acid-Modified Precipitated Calcium Carbonate," Ind. Eng. Chem. Res., vol. 49, No. 12, 2010, pp. 5625-5630.
Office Action dated Nov. 20, 2018 for Korean Application No. 10-2017-7006787.
International Search Report dated Nov. 20, 2013 for PCT/EP2013/071185.
Written Opinion of the International Searching Authority dated Nov. 20, 2013 for PCT/EP2013/071185.
Office Action dated Oct. 2, 2017 for U.S. Appl. No. 14/431,345.
Office Action dated Feb. 23, 2018 for U.S. Appl. No. 14/431,345.
Office Action dated Jul. 6, 2018 for U.S. Appl. No. 14/431,345.
Office Action dated Nov. 16, 2018 for U.S. Appl. No. 14/431,345.

* cited by examiner

SURFACE-TREATED FILLERS FOR BREATHABLE FILMS

CROSS-REFERENCE TO RELATED APPLICATIONS

This is a U.S. national phase of PCT Application No. PCT/EP2015/068520, filed Aug. 12, 2015, which claims priority to European Application No. 14181082.0, filed Aug. 14, 2014 and U.S. Provisional Application No. 62/039,967, filed Aug. 21, 2014.

The present invention relates to the field of breathable films, and more specifically to a breathable film comprising a thermoplastic polymer and a surface-treated filler, to the use thereof and to a process for producing said breathable film as well as to the use of surface-treated fillers in breathable films.

The first breathable films for hygiene products were developed as early as 1983 in Japan. Production of breathable films began in the USA in the mid 1990s and later in Europe, where they rapidly commanded a large market share. Currently, breathable films have two main fields of application: personal hygiene products, such as infant diapers, feminine hygiene pads (napkins, panty liners) or adult incontinence products, and construction industry, such as under-roofing membranes, house wraps or wall coverings. However, the specific permeability properties of these films also have uses in other industries, such as disposable clothing in medical and industrial applications.

Breathable films typically comprise a blend of thermoplastic polymers and an inorganic filler such as calcium carbonate and are produced by forming a film from said blend by casting or blowing with subsequent stretching of the film. The stretching process delaminates the polymer from the surface of the inorganic filler particles, which produces micropores, often referred to as "voids" in the film's cross section, which allows the passage of water vapour during end-use.

A problem encountered with the use of inorganic mineral fillers is the presence of volatiles associated with the mineral fillers. Such volatiles may evolve at temperatures reached during the application of the fillers and may lead to the degradation of the quality of the final mineral-comprising polymer product during the processing of such mineral filler-comprising products. Moreover, such associated volatiles may lead to a reduction in the tensile and tear strength of a breathable film, and may degrade its visible aspects, in particular its visible uniformity. Volatiles can also generate excessive foaming of the mineral filled polymer melt during a step of compounding, causing unwanted product build-up at the vacuum extraction and hence, forcing a reduced output rate.

Said volatiles may, for example, be inherently associated with the mineral filler ("inherent volatiles"), and are especially associated water, and/or may be introduced during the treatment of the mineral filler ("added volatiles"), for example, to render the mineral filler more dispersible within a plastic medium. Furthermore, volatiles may be generated by the reaction of inherent organic materials and/or added organic materials with the mineral filler, whereas such reactions may especially be induced or enhanced by the temperatures reached during the introduction and/or processing of the filled polymeric material, for example, during the extrusion or compounding process. Said volatiles may also be generated by the degradation of inherent organic materials and/or added organic materials, forming $CO_2$, water and possibly low molecular mass fractions of these organic materials. Such a degradation may especially be induced or enhanced by the temperatures reached during the introduction and/or processing of the polymeric material comprising the treated mineral filler, such as during the extrusion or compounding process.

One obvious means to increase the volatile onset temperature and to limit the quantity of volatiles associated with a mineral filler is to avoid or limit the use of certain common filler treatment additives.

However, often, as in the case when a mineral filler is applied in a plastic application, such additives are needed to ensure other functions. For example, in order to obtain uniform distribution barrier and vapour transmission properties throughout the film it is required to have the filler as equally distributed throughout the film as possible. Therefore, usually additives are introduced to provide the mineral filler with a hydrophobic coating and to improve the dispersability of the mineral filler in the film precursor material as well as possibly to improve the processability of this film precursor material and/or properties of the final application products. An elimination of such additives would unacceptably compromise the resulting film quality.

In the art, several attempts have been made to improve the applicability of mineral filler materials and especially calcium carbonate-comprising mineral filler materials, e.g. by treating such mineral filler materials with aliphatic carboxylic acids, and aliphatic carboxylic acid salts, which in some cases may also be referred to as fatty acids and fatty acid salts. For instance, WO 00/20336 relates to an ultrafine natural calcium carbonate, which may optionally be treated with one or several fatty acids or one or several salts or mixtures thereof, and which is used as a rheology regulator for polymer compositions.

Likewise, U.S. Pat. No. 4,407,986 A relates to a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

EP 0 998 522 A1 relates to a surface-treated calcium carbonate filler for breathable films using fatty acids of at least 10 carbon atoms wherein the filler before and after the treatment process has to be mostly free of moisture in the range of below 0.1 wt.-%. However, to achieve and maintain such low moisture content, a high consumption of energy and costs is required. Thus, such low moisture content is not the ideal parameter for influencing and controlling the reaction of a solid mineral surface with treatment additives to achieve a good quality of surface-treated filler material product at low energy costs.

DeArmitt et al., Improved thermoplastic composites by optimised surface treatment of the mineral fillers, Institute for Surface Chemistry, August 2000, describes a wet treatment process in which a batch suspension comprising a mineral filler material is contacted with a dispersant at room temperature for one hour. However, such wet treatment process has the disadvantage that the wetting of a dry product for treatment and the subsequent drying is energy- and cost-consuming.

US 2002/0102404 A1 describes dispersible calcium carbonate particles coated on their surface with a combination of saturated and unsaturated fatty carboxylic acids and salts thereof along with an organic compound such as a phthalic ester, which are used in adhesive compositions to improve viscosity stability and adhesion properties. However, US 2002/0102404 requires the implementation of a mixture of saturated and unsaturated aliphatic carboxylic acids/salts. The presence of unsaturated aliphatic carboxylic acids/salts increases the risk of unwanted in situ side reactions with the double bond during processing of any unsaturated aliphatic carboxylic acid/salt-comprising material. Additionally, the presence of unsaturated aliphatic carboxylic acids/salts may result in discoloration of, or unwanted odour development, and notably rancid odours, in the material in which they are implemented.

U.S. Pat. No. 4,520,073 A describes mineral filler materials with improved hydrophobic coatings prepared by pressure coating of porous minerals using steam as a carrier for the coating material. Said coating material may be selected, among other options, from long chain aliphatic fatty acids and their salts.

WO 01/32787 A1 describes a particulate alkaline earth metal carbonate material product which has on its particles a coating of hydrophobic material comprising a composition formed of (a) a first component which comprises the reaction product of the alkaline earth metal carbonate and at least one given aliphatic carboxylic acid and of (b) a second component having a carbonate release temperature substantially higher than the first component comprises a compound of formula $CH_3(CH_2)_mCOOR$.

WO 2008/077156 A2 relates to spunlaid fibers comprising at least one polymeric resin and at least one filler having an average particle size of less than or equal to about 5 micrometers and/or having a top cut of less than about 15 micrometers, wherein the at least one filler is present in an amount of less than about 40% by weight, relative to the total weight of the spunlaid fibers. The coating of the filler is described as being at least one organic material chosen from fatty acids and salts and esters thereof, e.g. stearic acid, stearate, ammonium stearate and calcium stearate.

WO 2005/075353 discloses a natural alkaline earth metal carbonate having a $d_{50}$ of about 0.5 micrometers or less and a moisture pick up of less than about 0.2 wt-% as well as a process for making the particulate carbonate by grinding. The carbonate may be used in polymer compositions.

WO 2009/094321 discloses monofilament fibers comprising at least one polymeric resin and at least one coated filler, wherein the at least one coated filler has an average particle size of less than or equal to about 3 micrometers and/or has a top cut of less than or equal to about 10 micrometers, and wherein the at least one coated filler is present in an amount of less than or equal to about 50 wt.-%, relative to the total weight of the monofilament fibers. Also disclosed therein are methods for producing monofilament fibers comprising adding ground calcium carbonate to at least one polymeric resin and extruding the resulting mixture.

WO 2011/028934 relates to fibers, such as staple fibers, comprising at least one polymeric resin and at least one coated filler, wherein the at least one coated filler has an average particle size of less than or equal to about 3 micrometers, and wherein the at least one coated filler is present in an amount of less than or equal to about 50 wt.-%, relative to the total weight of the fibers. Also disclosed therein are methods for producing staple fibers, webs, fabrics, and carpets comprising adding at least one filler to at least one polymeric resin and processing the resulting mixture.

WO 2012/052778 discloses tearable polymer films comprising a polyester and a filler, polymer compositions for making said films, methods of production as well as uses thereof.

GB 2 336 366 A relates to filled thermoplastic compositions, and, in particular, filled low density polyethylene compositions which are to be formed into products or articles by the process of extrusion. It is further described that the hydrophobising agent is preferably an organic carboxylic acid or partially or fully neutralised salt thereof which has at least one saturated or unsaturated hydrocarbon chain having from 8 to 28 carbon atoms, if the particulate mineral filler has a neutral to alkaline surface reaction, for example calcium carbonate.

EP 2 159 258 A1 relates to a treated mineral filler product comprising at least one mineral filler, a treatment layer located on the surface of said mineral filler, wherein the treatment layer comprises at least one saturated C8 to C24 aliphatic carboxylic acid, and at least one di- and/or trivalent cation salt of one or more saturated C8 to C24 aliphatic carboxylic acid, wherein the weight ratio of all of said aliphatic carboxylic acid(s): all of said aliphatic acid(s) is from 51:49 to 75:25; and said treatment layer is present in an amount of at least 2.5 mg/m$^2$ of said mineral filler.

EP 1 980 588 relates to the domain of mineral filler treatment processes. The process for the preparation of a treated mineral filler product comprises the following steps: (a) treating at least one dry mineral filler with at least one Group II or Group III salt of a C8 to C24 aliphatic monocarboxylic acid to produce an intermediate mineral filler product; followed by (b) treating the intermediate mineral filler product of step (a) with at least one C8 to C24 aliphatic monocarboxylic acid to produce a treated mineral filler product. The treated mineral filler products, such as treated calcium carbonate may be used in plastic applications, such as in polypropylene(PP)- or polyethylene(PE)-based breathable or extrusion coating film applications.

DE 958 830 is directed towards a method for the treatment of natural calcium carbonates with surface-active substances which is characterized in that the calcium carbonate is ground in the presence of natural or synthetic fatty acids, amino-fatty acids, acid amides, fatty alcohols, waxes, and resins. The natural or synthetic surface-active substances may be present in amount of from 0.1 to 40% and grinding may be carried out at temperatures of at least 80° C.

In view of the foregoing, improving the properties of breathable films and filler materials used therein remains of interest to the skilled man.

Accordingly, it is an object of the present invention to provide a breathable film which retains good breathability and low film defect levels. It would also be desirable to provide a breathable film with good colour properties and good processing characteristics such as low die build-up properties. It would also be desirable to provide a breathable film, which has a reduced potential of skin irritation.

Another object of the present invention is the provision of a filler material for breathable films, which shows good dispersing properties and compounding performance in breathable film applications. It would also be desirable to provide a filler material having a high temperature resistance, and thus, allows higher processing temperatures during the production of breathable films. Furthermore, it would be desirable to provide a filler material which exhibits a low moisture absorption, and therefore, reduces or avoids the problem encountered with associated volatiles, and especially water.

It is also an object of the present invention to provide a filler material for breathable films, which allows processing into a masterbatch or a compound, using a continuous process and especially avoids the problem of foaming during the continuous production of a masterbatch or a compound, which can lead to an interruption of the production process causing a reduced output rate. Furthermore, the risk of leaching of the surface coating, especially when in contact with human skin, should be minimized.

The foregoing objects and other objects are solved by the subject-matter as defined herein in the independent claims.

According to one aspect of the present invention, a breathable film comprising at least one thermoplastic polymer and a surface-treated filler material product is provided, wherein the surface-treated filler material product comprises
A) at least one ground calcium carbonate-comprising filler material having
  a weight median particle size $d_{50}$ in the range from 0.1 µm to 7 µm,
  a top cut particle size $d_{98}$ of ≤15 µm,
  a specific surface area (BET) from 0.5 to 150 m²/g, as measured using nitrogen and the BET method according to ISO 9277, and
  a residual total moisture content of ≤1 wt.-%, based on the total dry weight of the at least one ground calcium carbonate-comprising filler material, and
B) a treatment layer on the surface of the at least one ground calcium carbonate-comprising filler material comprising at least one mono-substituted succinic anhydride and/or at least one mono-substituted succinic acid and/or salty reaction product(s) thereof,
wherein the surface-treated filler material product comprises the treatment layer in an amount of from 0.1 to 3 wt.-%, based on the total dry weight of the at least one ground calcium carbonate-comprising filler material.

According to a further aspect, a process for producing a breathable film is provided comprising the steps of:
a) providing a composition comprising at least one thermoplastic polymer and a surface-treated filler material product, and
b) forming a film from the composition of step a), and
c) stretching the film obtained in step b) into at least one direction,
wherein the surface-treated filler material product comprises
A) at least one ground calcium carbonate-comprising filler material having
  a weight median particle size $d_{50}$ in the range from 0.1 µm to 7 µm,
  a top cut particle size $d_{98}$ of ≤15 µm,
  a specific surface area (BET) from 0.5 to 150 m²/g, as measured using nitrogen and the BET method according to ISO 9277, and
  a residual total moisture content of ≤1 wt.-%, based on the total dry weight of the at least one ground calcium carbonate-comprising filler material, and
B) a treatment layer on the surface of the at least one ground calcium carbonate-comprising filler material comprising at least one mono-substituted succinic anhydride and/or at least one mono-substituted succinic acid and/or salty reaction product(s) thereof,
wherein the surface-treated filler material product comprises the treatment layer in an amount of from 0.1 to 3 wt.-%, based on the total dry weight of the at least one ground calcium carbonate-comprising filler material.

According to still another aspect of the present invention, a use of a surface-treated filler material product as filler in a breathable film is provided, wherein the surface-treated filler material product comprises
A) at least one ground calcium carbonate-comprising filler material having
  a weight median particle size $d_{50}$ in the range from 0.1 µm to 7 µm,
  a top cut particle size $d_{98}$ of ≤15 µm,
  a specific surface area (BET) from 0.5 to 150 m²/g, as measured using nitrogen and the BET method according to ISO 9277, and
  a residual total moisture content of ≤1 wt.-%, based on the total dry weight of the at least one ground calcium carbonate-comprising filler material, and
B) a treatment layer on the surface of the at least one ground calcium carbonate-comprising filler material comprising at least one mono-substituted succinic anhydride and/or at least one mono-substituted succinic acid and/or salty reaction product(s) thereof,
wherein the surface-treated filler material product comprises the treatment layer in an amount of from 0.1 to 3 wt.-%, based on the total dry weight of the at least one ground calcium carbonate-comprising filler material.

According to still another aspect of the present invention, an article comprising a breathable film according to the present invention is provided, wherein the article is selected from the group consisting of hygiene products, medical products, healthcare products, filter products, geotextile products, agriculture products, horticulture products, clothing, footwear products, baggage products, household products, industrial products, packaging products, building products, and construction products.

According to still another aspect of the present invention, a use of a breathable film according to the present invention in hygienic applications, medical applications, healthcare applications, filtration materials, geotextile products, agricultural applications, horticultural applications, clothing, footwear products, baggage products, household applications, industrial applications, packaging applications, building applications, or construction is provided.

Advantageous embodiments of the present invention are defined herein and also in the corresponding sub-claims.

According to one especially preferred embodiment of the present invention, the at least one ground calcium carbonate-comprising filler material is a wet ground calcium carbonate-comprising filler material. Accordingly, it is specifically contemplated or preferred to use wet ground calcium-carbonate-comprising filler materials in relation to the foregoing aspects of the present invention.

According to one embodiment the at least one thermoplastic polymer is a polyolefin, preferably selected from the group consisting of polypropylene, polyethylene, polybutylene, and mixtures thereof, and more preferably selected from the group consisting of high density polyethylene (HDPE), linear low density polyethylene (LLDPE), low density polyethylene (LDPE), ultra-low density polyethylene (ULDPE), very low density polyethylene (VLDPE), and mixtures thereof.

According to one embodiment the breathable film comprises the surface-treated filler material product in an amount from 1 to 85 wt.-%, based on the total weight of the breathable film, preferably from 2 to 80 wt.-%, more preferably from 5 to 75 wt.-%, even more preferably from 10 to 65 wt.-%, and most preferably from 15 wt.-% to 60 wt.-%. According to another embodiment the at least one ground (especially wet ground) calcium carbonate-comprising filler material is natural ground calcium carbonate (GCC), precipitated calcium carbonate, modified calcium carbonate, surface-treated calcium carbonate, or a mixture thereof, and preferably natural ground calcium carbonate (GCC).

According to one embodiment the at least one ground (especially wet ground) calcium carbonate-comprising filler material has a weight median particle size $d_{50}$ from 0.25 µm to 5 µm, and preferably from 0.7 µm to 4 µm. According to another embodiment the at least one ground (especially wet ground) calcium carbonate-comprising filler material has a top cut particle size $d_{98}$ of ≤12.5 µm, preferably of ≤10 µm, and most preferably of ≤7.5 µm. According to still another embodiment the at least one ground (especially wet ground) calcium carbonate-comprising filler material has a specific surface area (BET) of from 0.5 to 50 m²/g, more preferably of from 0.5 to 35 m²/g, and most preferably of from 0.5 to 15 m²/g, as measured using nitrogen and the BET method according to ISO 9277.

According to still another embodiment the at least one ground (especially wet ground) calcium carbonate-comprising filler material has a residual total moisture content of from 0.01 to 0.2 wt.-%, preferably from 0.02 to 0.15 wt.-%, and most preferably from 0.04 to 0.15 wt.-%, based on the total dry weight of the at least one ground (especially wet ground) calcium carbonate-comprising filler material.

According to one embodiment of the present invention, the treatment layer on the surface of the at least one ground (especially wet ground) calcium carbonate-comprising filler material comprises at least one mono-substituted succinic anhydride and at least one mono-substituted succinic acid and/or salty reaction product(s) of the mono-substituted succinic anhydride and/or the mono-substituted succinic acid.

According to one embodiment the at least one mono-substituted succinic anhydride consists of succinic anhydride mono-substituted with a group selected from a linear, branched, aliphatic and cyclic group having a total amount of carbon atoms from C2 to C30, preferably from C3 to C25, and most preferably from C4 to C20 in the substituent. According to another embodiment the surface-treated filler material product has a moisture pick-up from 0.1 to 1 mg/g, preferably from 0.2 to 0.9 mg/g, and most preferably from 0.2 to 0.8 mg/g, at a temperature of 23° C. (±2° C.).

According to one embodiment the surface-treated filler material product has a volatile onset temperature ≥250° C., preferably ≥260° C., and most preferably ≥270° C. According to another embodiment the composition provided in step a) of the inventive process is a masterbatch or a compound obtained by mixing or compounding said components. The at least one thermoplastic polymer and the surface-treated filler material product, and, if present, other optional additives, may be mixed by the use of a suitable mixer, e.g. a Henschel mixer, a super mixer, a tumbler type mixer or the like.

The compounding step may be done with a suitable extruder, preferably by a twin screw extruder (co- or counter-rotating) or by any other suitable continuous compounding equipment, e.g. a continuous co-kneader (Buss), a continuous mixer (Farrel Pomini), a ring extruder (Extricom) or the like. The continuous polymer mass from extrusion may be either pelletized by (hot cut) die face pelletizing with underwater pelletizing, eccentric pelletizing and waterring pelletizing or by (cold cut) strand pelletizing with underwater and conventional strand pelletizing to form the extruded polymer mass into pellets.

Optionally, the compounding step may also be performed with a discontinuous or batch process using an internal (batch) mixer, e.g. a Banburry mixer (HF Mixing Group) or a Brabender mixer (Brabender) or the like.

It should be understood that for the purposes of the present invention, the following terms have the following meanings:

The term "ground calcium carbonate-comprising filler" in the gist of the present invention means a calcium carbonate-comprising filler which has been manufactured by a process including at least one grinding step. "Ground calcium carbonate-comprising fillers may be "wet ground" or "dry ground", wherein a "wet ground calcium carbonate-comprising filler" in the meaning of the present invention is a ground calcium carbonate comprising filler which has been manufactured by a process including at least one grinding step in aqueous suspension with a solids content between 20 and 80 wt.-% and a "dry ground calcium carbonate-comprising filler" is a ground calcium carbonate comprising filler which has been manufactured by a process including at least one grinding step in aqueous suspension with a solids content of more than 80 and up to 100 wt.-%.

The term "breathable film" in the meaning of the present invention refers to a polymer film that allows the passage of gases and moisture vapour, for example, due to the presence of micropores. The "breathability" of a breathable film can be measured by its water vapour transmission rate (WVTR), which is specified in g/(m²·day). For example, a polymer film may considered as being "breathable" if it has a WVTR of at least 1000 g/(m²·day). The WVTR may be determined with a Lyssy L80-5000 measuring device according to ASTM E398.

A "film" in the meaning of the present invention is a sheet or layer of material having a median thickness which is small compared to its length and width. For example, the term "film" may refer to a sheet or layer of material having a median thickness of less than 200 µm, but more than 1 µm.

As used herein, "hydrohead" is a measure of the breathable film's resistance to liquid penetration, this means its barrier properties. The barrier properties of a breathable film were measured by using the hydrostatic pressure test which measures the resistance of the film sample to the penetration of water under low hydrostatic pressure. The procedure used is equivalent to AATCC Test Method 127-2013, WSP 80.6 and ISO 811. A film sample (test area=10 cm²) is mounted to form a cover on the test head reservoir. This film sample is subjected to a standardized water pressure, increased at a constant rate until leakage appears on the outer surface of the film, or water burst occurs as a result of film failure (pressure rate gradient=100 mbar/min). Water pressure is measured as the hydrostatic head height reached at the first sign of leakage in three separate areas of the film sample or when burst occurs. The head height results are recorded in centimeters or millibars of water pressure on the specimen. A higher value indicates greater resistance to water penetration. The TEXTEST FX-3000, Hydrostatic Head Tester (Textest AG, Switzerland), was used for the hydrostatic pressure measurements.

For the purpose of the present invention, the term "calcium carbonate-comprising filler material" refers to a material that comprises at least 80 wt.-% calcium carbonate, based on the total dry weight of the calcium carbonate-comprising filler material.

"Natural ground calcium carbonate" (GCC) in the meaning of the present invention is a calcium carbonate obtained from natural sources, such as limestone, marble, dolomite or chalk, and processed through a wet treatment such as grinding, screening and/or fractionation, for example by a cyclone or classifier.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, EP 2 070 991 A1, or EP 2 264 108 A1.

The term "surface-treated filler material product" in the meaning of the present invention refers to a calcium carbonate-comprising filler material which has been contacted with a surface treatment agent such as to obtain a coating layer on at least a part of the surface of the calcium carbonate-comprising filler material.

The term "succinic anhydride", also called dihydro-2,5-furandione, succinic acid anhydride or succinyl oxide, has the molecular formula $C_4H_4O_3$ and is the acid anhydride of succinic acid.

The term "mono-substituted" succinic anhydride in the meaning of the present invention refers to a succinic anhydride wherein a hydrogen atom is substituted by another substituent.

The term "mono-substituted" succinic acid in the meaning of the present invention refers to a succinic acid wherein a hydrogen atom is substituted by another substituent.

The term "dry" calcium carbonate-comprising filler material is understood to be a filler material having less than 0.3% by weight of water relative to the filler material weight. The % water (equal to "residual total moisture content") is determined according to the Coulometric Karl Fischer measurement method, wherein the filler material is heated to 220° C., and the water content released as vapour and isolated using a stream of nitrogen gas (at 100 ml/min) is determined in a Coulometric Karl Fischer unit.

The term "moisture pick-up susceptibility" in the meaning of the present invention refers to the amount of moisture adsorbed on the surface of the mineral filler and can determined in mg moisture/g of the dry treated mineral filler product after exposure to an atmosphere of 10 and 85% of relative humidity, resp., for 2.5 hours at a temperature of +23° C. (±2° C.).

The term "polymer composition" refers to a composite material comprising at least one additive (e.g., at least one filler) and at least one polymer material which may be used in the production of a polymer product.

The term "polymer masterbach" (=or "masterbatch") relates to a composition with a relative high filler content, preferably at least or equal to 60 wt.-% (based on the total weight of the composition). A "polymer masterbatch" may be added to an unfilled or lowly filled polymer during processing in order to achieve higher filler contents. Nevertheless, a "polymer composition" (=or "composition") as defined earlier having a relative low filler content, preferably below 60 wt.-% (based on the total weight of the composition), and which often also referred to as a "polymer compound" (=or "compound"), may also be used directly in the production of a polymer product.

Accordingly, the term "polymer composition" (=composition) as used herein comprises both, "polymer masterbatches" and "polymer compounds".

For the purpose of the present application, the "volatile onset temperature" is defined as the temperature at which volatiles—including volatiles introduced as a result of common mineral filler preparation steps including grinding, with or without grinding aid agents, beneficiation, with or without flotation aid or other agents, and other pre-treatment agents not expressly listed above, detected according to the thermogravimetric analysis described hereafter—begin to evolve, as observed on a thermogravimetric (TGA) curve, plotting the mass of remaining sample (y-axis) as a function of temperature (x-axis), the preparation and interpretation of such a curve being defined hereafter.

TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. In the present invention, thermogravimetric analysis (TGA) is performed using a Mettler Toledo TGA 851 based on a sample of 500+/−50 mg and scanning temperatures from 25 to 280° C. or 25 to 400° C. at a rate of 20° C./minute under an air flow of 70 ml/min. The skilled man will be able to determine the "volatile onset temperature" by analysis of the TGA curve as follows: the first derivative of the TGA curve is obtained and the inflection points thereon between 150 and 280° C. or 25 to 400° C. are identified. Of the inflection points having a tangential slope value of greater than 45° relative to a horizontal line, the one having the lowest associated temperature above 200° C. is identified. The temperature value associated with this lowest temperature inflection point of the first derivative curve is the "volatile onset temperature". The total weight of the surface treatment agent on the accessible surface area of the filler can be determined by thermogravimetric analysis by mass loss between 105° C. to 400° C.

For the purpose of the present application, the "total volatiles" associated with mineral fillers and evolved over a temperature range of 25 to 280° C. or 25 to 400° C. is characterised according to % mass loss of the mineral filler sample over a temperature range as read on a thermogravimetric (TGA) curve. The "total volatiles" evolved on the TGA curve is determined using Star® SW 9.01 software. Using this software, the curve is first normalised relative to the original sample weight in order to obtain mass losses in % values relative to the original sample. Thereafter, the temperature range of 25 to 280° C. or 25 to 400° C. is selected and the step horizontal (in German: "Stufe horizontal") option selected in order to obtain the % mass loss over the selected temperature range.

The term "salty reaction products" in the meaning of the present invention refers to products obtained by contacting a calcium carbonate-comprising filler material with one or more mono-substituted succinic anhydride(s). Said salty reaction products are formed between the mono-substituted succinic acid which is formed from the applied mono-substituted succinic anhydride and reactive molecules located at the surface of the calcium carbonate-comprising filler material. Alternatively, said salty reaction products are formed between the mono-substituted succinic acid, which may optionally be present with the at least one mono-substituted succinic anhydride, and reactive molecules located at the surface of the calcium carbonate-comprising filler material.

The term "specific surface area" (in $m^2/g$) of the mineral filler in the meaning of the present invention is determined using the BET method with nitrogen as adsorbing gas, which is well known to the skilled man (ISO 9277:1995). The total surface area (in $m^2$) of the mineral filler is then obtained by multiplying the specific surface area by the mass (in g) of the mineral filler prior to treatment.

Throughout the present document, the "particle size" of a calcium carbonate-comprising filler is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

For the purpose of the present invention, the "solids content" of a liquid composition is a measure of the amount of material remaining after all the solvent or water has been evaporated.

A "suspension" or "slurry" in the meaning of the present invention comprises insoluble solids and water, and optionally further additives, and usually contains large amounts of solids and, thus, is more viscous and can be of higher density than the liquid from which it is formed.

A "treatment layer" in the gist of the present invention refers to a layer, preferably a monolayer of a surface treatment agent on the surface of the at least one ground calcium carbonate-comprising filler material. The "treatment layer" comprises as surface treatment agent at least one mono-substituted succinic anhydride and/or at least one mono-substituted succinic acid and/or salty reaction product(s) thereof.

An "after treatment layer" in the meaning of the present invention refers to a layer, preferably a monolayer of a surface treatment agent which can be different from the at least one mono-substituted succinic anhydride and/or at least one mono-substituted succinic acid and/or salty reaction product(s) thereof, the "after treatment layer" is located on the "treatment layer".

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive breathable film comprises at least one thermoplastic polymer and a surface-treated filler material product. The surface-treated filler material product comprises (A) at least one ground (especially wet ground) calcium carbonate-comprising filler material having a weight median particle size $d_{50}$ in the range from 0.1 μm to 7 μm, a top cut particle size $d_{98}$ of ≤15 μm, a specific surface area (BET) from 0.5 to 150 $m^2/g$, as measured using nitrogen and the BET method according to ISO 9277, and a residual total moisture content of ≤1 wt.-%, based on the total dry weight of the at least one ground (especially wet ground) calcium carbonate-comprising filler material, and (B) a treatment layer on the surface of the at least one ground (especially wet ground) calcium carbonate-comprising filler material comprising at least one mono-substituted succinic anhydride and/or at least one mono-substituted succinic acid and/or salty reaction product(s) thereof. The surface-treated filler material product comprises the treatment layer in an amount of from 0.1 to 3 wt.-%, based on the total dry weight of the at least one ground (especially wet ground) calcium carbonate-comprising filler material.

In the following details and preferred embodiments of the inventive product will be set out in more detail. It is to be understood that these technical details and embodiments also apply to the inventive process for producing said breathable film and the inventive use of the breathable film and the surface-treated filler material product.

Thermoplastic Polymer

The breathable film of the present invention comprises at least one thermoplastic polymer. It is appreciated that the at least one thermoplastic polymer is not restricted to a specific material as long as the polymer is suitable for the preparation of a breathable film. The skilled person will select the thermoplastic polymer in accordance with the desired properties of the breathable film such as temperature resistance or elastic recovery.

According to one embodiment, the at least one thermoplastic polymer is a polyolefin. Polyolefin polymers that may be used are preferably selected from the group consisting of polypropylene, polyethylene, polybutylene, and mixtures thereof.

According to one embodiment, the at least one thermoplastic polymer is a polyethylene, preferably selected from the group consisting of high density polyethylene (HDPE), linear low density polyethylene (LLDPE), low density polyethylene (LDPE), ultra-low density polyethylene (ULDPE), very low density polyethylene (VLDPE), and mixtures thereof.

A polyethylene having a density ranging from 0.936 $g/m^3$ to about 0.965 $g/m^3$ is typically called "high density polyethylenes (HDPE)".

A polyethylene having a density ranging from 0.910 $g/m^3$ to about 0.940 $g/m^3$ is typically called "low density polyethylenes (LDPE)".

The term "linear low density polyethylene (LLDPE)" refers to a substantially linear polymer (polyethylene), with significant numbers of short branches, commonly made by copolymerization of ethylene with longer-chain olefins. Linear low-density polyethylene differs structurally from low-density polyethylene (LDPE) in the absence of long chain branching. The linearity of LLDPE results from the different manufacturing processes of LLDPE. In general, LLDPE is produced at lower temperatures and pressures by copolymerization of ethylene and higher alpha-olefins such as 1-butene, 1-hexene, or 1-octene. LLDPE has typically a density in the range from 0.911 $g/m^3$ to 0.940, and preferably in the range from 0.912 $g/m^3$ to 0.928 $g/m^3$ for breathable film applications.

"Very low density linear low density polyethylenes (VLDPE) is a substantially linear polymer with high levels of short-chain branches, commonly made by copolymerization of ethylene with short-chain alpha-olefins such as 1-butene, 1-hexene or 1-octene. VLDPE has typically a density in the range from 0.900 to 0.914 g/cm$^3$.

"Ultra-low density linear low density polyethylenes (ULDPE) is a substantially linear polymer with high levels of short-chain branches, commonly made by copolymerization of ethylene with short-chain alpha-olefins such as 1-butene, 1-hexene or 1-octene. ULDPE has typically a density in the range from 0.860 to 0.899 g/cm$^3$.

According to one embodiment, the at least one thermoplastic polymer consists of only one type of thermoplastic polymer. According to another embodiment, the at least thermoplastic polymer consists of a blend of two or more types of thermoplastic polymers.

According to one embodiment, the thermoplastic polymer comprises a linear low density polyethylene (LLDPE), preferably a LLDPE having a density in the range from 0.912 g/m$^3$ to 0.928 g/m$^3$. The inventors found that LLDPE polymers having a density in said range may show very good barrier and processability properties, especially in combination with the surface-treated filler material product according to the present invention.

According to one preferred embodiment, the at least one thermoplastic polymer comprises 1 to 10 wt.-% LDPE, more preferably 3 to 7 wt.-% LDPE, and most preferably about 5 wt.-% LDPE, based on the total amount of thermoplastic polymer.

According to one embodiment of the present invention, the melt flow rate (MFR) determined according to ISO 1133 (190° C., 2.16 kg) of the at least one thermoplastic polymer is preferably from 0.01 to 20, and more preferably from 0.1 to 10 g/10 min.

The breathable film can comprise the at least one thermoplastic polymer in an amount of at least 15 wt.-%, based on the total weight of the breathable film, preferably of at least 20 wt.-%, more preferably of at least 30 wt.-%, and most preferably at least 40 wt.-%, for example, about 50 wt.-%. According to one embodiment, the breathable film comprises the at least one thermoplastic polymer in an amount from 15 to 70 wt.-%, preferably from 20 to 70 wt.-%, more preferably from 30 to 65 wt.-%, and most preferably from 40 to 60 wt.-%, based on the total weight of the breathable film.

Surface-treated Filler Material Product

The breathable film of the present invention also comprises a surface-treated filler material product, wherein the surface-treated filler material product comprises at least one ground (especially wet ground) calcium carbonate-comprising filler material having several essential features, which are defined in claim 1 and will be described in more detail in the following.

The at least one ground calcium carbonate-comprising filler material in the meaning of the present invention refers to a filler material selected from among natural ground calcium carbonate (GCC), precipitated calcium carbonate (PCC), modified calcium carbonate (MCC), surface-treated calcium carbonate, or mixtures thereof. According to a preferred embodiment, the at least one ground calcium carbonate-comprising filler material is a natural ground calcium carbonate (GCC), more preferably the ground calcium carbonate-carbonate comprising filler is a wet ground natural ground calcium carbonate.

GCC is understood to be a naturally occurring form of calcium carbonate, mined from sedimentary rocks such as limestone or chalk, or from metamorphic marble rocks and processed through a treatment such as grinding, screening and/or fractionizing in wet form, for example by a cyclone or classifier. In one embodiment of the present invention, the GCC is selected from the group comprising marble, chalk, dolomite, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

A modified calcium carbonate may feature a GCC or PCC with an internal structure modification or a surface-reacted GCC or PCC. A surface-reacted calcium carbonate may be prepared by providing a GCC or PCC in form of an aqueous suspension, and adding an acid to said suspension. Suitable acids are, for example, sulfuric acid, hydrochloric acid, phosphoric acid, citric acid, oxalic acid, or a mixture thereof. In a next step, the calcium carbonate is treated with gaseous carbon dioxide. If a strong acid such as sulfuric acid or hydrochloric acid is used for the acid treatment step, the carbon dioxide will form automatically in situ. Alternatively or additionally, the carbon dioxide can be supplied from an external source. Surface-reacted calcium carbonates are described, for example, in US 2012/0031576 A1, WO 2009/074492 A1, EP 2 264 109 A1, EP 2 070 991 A1, or EP 2 264 108 A1.

In one preferred embodiment, the at least one ground calcium carbonate-comprising filler material is marble, more preferably a wet ground marble.

It is appreciated that the amount of ground (especially wet ground) calcium carbonate in the at least one calcium carbonate-comprising filler material is at least 80 wt.-%, e.g. at least 95 wt.-%, preferably between 97 and 100 wt.-%, more preferably between 98.5 and 99.95 wt.-%, based on the total dry weight of the at least one ground calcium carbonate-comprising filler material.

The at least one ground (especially wet ground) calcium carbonate-comprising filler material is preferably in the form of a particulate material, and may have a particle size distribution as conventionally employed for the material(s) involved in the type of product to be produced. In general, it is one specific requirement of the present invention that the at least one ground (especially wet ground) calcium carbonate-comprising filler material has a weight median particle size $d_{50}$ value in the range from 0.1 to 7 µm. For example, the at least one ground (especially wet ground) calcium carbonate-comprising filler material has a weight median particle size $d_{50}$ from 0.25 µm to 5 µm and preferably from 0.7 µm to 4 µm.

A further requirement of the present invention is that the at least one ground (especially wet ground) calcium carbonate-comprising filler material has a top cut ($d_{98}$) of ≤15 µm. For example, the at least one ground (especially wet ground) calcium carbonate-comprising filler material has a top cut ($d_{98}$) of ≤12.5 µm, preferably of ≤10 µm and most preferably of ≤7.5 µm.

It is further appreciated that the at least one ground (especially wet ground) calcium carbonate-comprising filler material has a BET specific surface area of from 0.5 and 150 m$^2$/g, as measured using nitrogen and the BET method according to ISO 9277. For example, the at least one ground (especially wet ground) calcium carbonate-comprising filler material has a specific surface area (BET) of from 0.5 to 50 m$^2$/g, more preferably of from 0.5 to 35 m$^2$/g and most preferably of from 0.5 to 15 m$^2$/g, as measured using nitrogen and the BET method according to ISO 9277.

In one embodiment of the present invention, the at least one ground (especially wet ground) calcium carbonate-comprising filler material is preferably a marble having a median particle size diameter $d_{50}$ value from 0.1 µm to 7 µm, preferably from 0.25 µm to 5 µm and most preferably from 0.7 µm to 4 µm. In this case, the at least one ground (especially wet ground) calcium carbonate-comprising filler material exhibits a BET specific surface area of from 0.5 to 150 m$^2$/g, preferably of from 0.5 to 50 m$^2$/g, more preferably of from 0.5 to 35 m$^2$/g and most preferably of from 0.5 to 15 m$^2$/g, measured using nitrogen and the BET method according to ISO 9277. In a preferred embodiment the ground calcium carbonate-comprising filler is a wet ground calcium carbonate-comprising filler. However, dry ground calcium carbonate-comprising fillers may also be used.

The wet grinding step may be performed under conditions such that autogenous grinding takes place and/or by horizontal ball milling, and/or other such processes known to the skilled man. The processed ground calcium carbonate-comprising filler material thus obtained may be washed and dewatered by well-known processes, e.g. by flocculation, filtration or forced evaporation prior to drying. The subsequent step of drying may be carried out in a single step such as spray drying, or in at least two steps, e.g. by applying a first heating step to the wet ground calcium carbonate-comprising filler material in order to reduce the associated moisture content to a level which is not greater than about 0.5 wt.-%, based on the total dry weight of the at least one wet ground calcium carbonate-comprising filler material. The residual total moisture content of the filler can be measured by the Karl Fischer Coulometric titration method, desorbing the moisture in an oven at 195° C. and passing it continuously into the KF Coulometer (Mettler Toledo Coulometric KF Titrator C30, combined with Mettler oven DO 0337) using dry N$_2$ at 100 ml/min for 10 min. The residual total moisture content can be determined with a calibration curve and also a blind of 10 min gas flow without a sample can be taken into account. The residual total moisture content may be further reduced by applying a second heating step to the at least one wet ground calcium carbonate-comprising filler material. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the at least one wet ground calcium carbonate-comprising filler material is subjected to a beneficiation step (such as a flotation, bleaching or magnetic separation step) to remove impurities.

In another preferred embodiment, the at least one ground (especially wet ground) calcium carbonate-comprising filler material is a material being ground in a horizontal ball mill, and subsequently dried by using the well-known process of spray drying.

According to the present invention the at least one ground calcium carbonate-comprising filler material has a residual moisture content of ≤1 wt.-%, based on the total dry weight of the at least one ground calcium carbonate-comprising filler material. Depending on the at least one ground calcium carbonate-comprising filler material, the at least one ground calcium carbonate-comprising filler material has a residual total moisture content of from 0.01 to 1 wt.-%, preferably from 0.01 to 0.2 wt.-%, more preferably from 0.02 to 0.15 wt.-% and most preferably from 0.04 to 0.15 wt.-%, based on the total dry weight of the at least one ground calcium carbonate-comprising filler material.

For example, in case a ground (especially wet ground) and spray dried marble is used as the at least one ground calcium carbonate-comprising filler material, the residual total moisture content of the at least one ground calcium carbonate-comprising filler material is preferably of from 0.01 to 0.1 wt.-%, more preferably from 0.02 to 0.08 wt.-% and most preferably from 0.04 to 0.07 wt.-% based on the total dry weight of the at least one ground calcium carbonate-comprising filler material. If a PCC is used as the at least one ground calcium carbonate-comprising filler material, the residual total moisture content of the at least one ground calcium carbonate-comprising filler material is preferably of from 0.01 to 0.2 wt.-%, more preferably from 0.05 to 0.17 wt.-% and most preferably from 0.05 to 0.10 wt.-%, based on the total dry weight of the at least one ground calcium carbonate-comprising filler material.

According to the present invention the surface-treated filler material product further comprises a treatment layer on the surface of the at least one ground (especially wet ground) calcium carbonate-comprising filler material comprising at least one mono-substituted succinic anhydride and/or at least one mono-substituted succinic acid and/or salty reaction product(s) thereof.

It is appreciated that the expression "at least one" mono-substituted succinic anhydride means that one or more kinds of mono-substituted succinic anhydride may be provided in the process of the present invention.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride is one kind of mono-substituted succinic anhydride.

It is appreciated that the at least one mono-substituted succinic anhydride represents a surface treatment agent and consists of succinic anhydride mono-substituted with a group selected from any linear, branched, aliphatic and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic and cyclic group having a total amount of carbon atoms from C3 to C20 in the substituent. For example, the at least one mono-substituted succinic anhydride consists of succinic anhydride mono-substituted with a group selected from a linear, branched, aliphatic and cyclic group having a total amount of carbon atoms from C4 to C18 in the substituent.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched and aliphatic group having a total amount of carbon atoms from C2 to C30, preferably from C3 to C20 and most preferably from C4 to C18 in the substituent.

Thus, it is preferred that the at least one mono-substituted succinic anhydride consists of succinic anhydride mono-substituted with one group being a linear or branched, alkyl group having a total amount of carbon atoms from C2 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C2 to C30, preferably from C3 to C20 and most preferably from C4 to C18 in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that e.g. the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are isobutylsuccinic anhydride, sec-butylsuccinic anhydride and/or tert-butylsuccinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear or branched alkenyl group having a total amount of carbon atoms from C2 to C30, preferably from C3 to C20 and most preferably from C4 to C18 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5 wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

If the at least one mono-substituted succinic anhydride is a mixture of two or more kinds of alkenyl mono-substituted succinic anhydrides, one alkenyl mono-substituted succinic anhydride is linear or branched octadecenyl succinic anhydride, while each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. For example, the at least one mono-substituted succinic anhydride is a mixture of two or more kinds of alkenyl mono-substituted succinic anhydrides, wherein one alkenyl mono-substituted succinic anhydride is linear octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. Alternatively, the at least one mono-substituted succinic anhydride is a mixture of two or more kinds of alkenyl mono-substituted succinic anhydrides, wherein one alkenyl mono-substituted succinic anhydride is branched octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof.

For example, the at least one mono-substituted succinic anhydride is a mixture of two or more kinds of alkenyl mono-substituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the at least one mono-substituted succinic anhydride is a mixture of two or more kinds of alkenyl mono-substituted succinic anhydrides, it is appreciated that one alkenyl mono-substituted succinic anhydride is present in an amount of from 20 to 60 wt.-% and preferably of from 30 to 50 wt.-%, based on the total weight of the at least one mono-substituted succinic anhydride provided.

For example, if the at least one mono-substituted succinic anhydride is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), it is preferred that the one or more octadecenyl succinic anhydride(s) is present in an amount of from 20 to 60 wt.-% and preferably of from 30 to 50 wt.-%, based on the total weight of the at least one mono-substituted succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60.

It is appreciated that the expression "at least one" mono-substituted succinic acid means that one or more kinds of mono-substituted succinic acid may be provided in the process of the present invention.

Accordingly, it should be noted that the at least one mono-substituted succinic acid may be one kind of mono-substituted succinic acid. Alternatively, the at least one mono-substituted succinic acid may be a mixture of two or more kinds of mono-substituted succinic acid. For example, the at least one mono-substituted succinic acid may be a mixture of two or three kinds of mono-substituted succinic acid, like two kinds of mono-substituted succinic acid.

In one embodiment of the present invention, the at least one mono-substituted succinic acid is one kind of mono-substituted succinic acid.

It is appreciated that the at least one mono-substituted succinic acid represents a surface treatment agent and consists of succinic acid mono-substituted with a group selected from any linear, branched, aliphatic and cyclic group having a total amount of carbon atoms from C2 to C30 in the substituent.

In one embodiment of the present invention, the at least one mono-substituted succinic acid consists of succinic acid mono-substituted with a group selected from a linear, branched, aliphatic and cyclic group having a total amount of carbon atoms from C3 to C20 in the substituent. For example, the at least one mono-substituted succinic acid consists of succinic acid mono-substituted with a group selected from a linear, branched, aliphatic and cyclic group having a total amount of carbon atoms from C4 to C18 in the substituent.

It is appreciated that the at least one mono-substituted succinic anhydride and the at least one mono-substituted succinic acid may comprise the same or different substituent.

In one embodiment of the present invention, the succinic acid molecule of the at least one mono-substituted succinic acid and the succinic anhydride molecule of the at least one mono-substituted succinic anhydride are mono-substituted with the same group selected from any linear, branched, aliphatic and cyclic group having a total amount of carbon atoms from C2 to C30, preferably from C3 to C20 and most preferably from C4 to C18 in the substituent.

If the at least one mono-substituted succinic anhydride is provided in combination with at least one mono-substituted succinic acid, the at least one mono-substituted succinic acid is present in an amount of ≤10 mol.-%, based on the molar sum of the at least one mono-substituted succinic anhydride and the at least one mono-substituted succinic acid. For example, the at least one mono-substituted succinic acid is present in an amount of ≤5 mol.-%, preferably of ≤2.5 mol.-% and most preferably of ≤1 mol.-%, based on the molar sum of the at least one mono-substituted succinic anhydride and the at least one mono-substituted succinic acid.

According to one embodiment the salty reaction product(s) of the mono-substituted succinic acid and/or the at least one mono-substituted succinic anhydride formed on the surface of said at least one ground calcium carbonate-comprising filler material are one or more calcium salts and/or one or more magnesium salts thereof.

According to one embodiment the treatment layer further comprises an organic material such as a polysiloxane. Preferred polysiloxanes are polydialkylsiloxanes as e.g. described in US 2004/0097616 A1. Most preferred are polydialkylsiloxanes selected from the group consisting of polydimethylsiloxane, preferably dimethicone, polydiethylsiloxane and polymethylphenylsiloxane and/or mixtures thereof.

According to another embodiment an after treatment layer is present on the treatment layer, said after treatment layer comprises at least one of the above-mentioned polydialkylsiloxanes.

In one preferred embodiment the surface treatment of the at least one ground (especially wet ground) calcium carbonate-comprising filler material is carried out in two steps, the first step comprising a treatment by at least one mono-substituted succinic anhydride and/or at least one mono-substituted succinic acid and/or salty reaction product(s) thereof for forming a treatment layer and the second step comprising a treatment by at least one polydialkylsiloxane for forming an after treatment layer.

In another embodiment the surface treatment is carried out by treating the at least one ground (especially wet ground) calcium carbonate-comprising filler material simultaneously with at least one mono-substituted succinic anhydride and/or at least one mono-substituted succinic acid and/or salty reaction product(s) thereof and at least one polydialkylsiloxane for forming a treatment layer.

Furthermore, the surface treatment can be carried out by treating the at least one ground (especially wet ground) calcium carbonate-comprising filler material first with a polydialkylsiloxane and subsequently with at least one mono-substituted succinic anhydride and/or at least one mono-substituted succinic acid and/or salty reaction product(s) thereof.

According to one embodiment the molar ratio of the at least one mono-substituted succinic anhydride and the optional at least one mono-substituted succinic acid to the salty reaction product(s) thereof is from 99.9:0.1 to 0.1:99.9, preferably from 70:30 to 90:10.

According to one embodiment the salty reaction product(s) of the mono-substituted succinic acid and/or the at least one mono-substituted succinic anhydride are one or more calcium and/or magnesium salts thereof.

Thus, it is appreciated that the at least one ground (especially wet ground) calcium carbonate-comprising filler material product comprises, and preferably consists of, at least one ground (especially wet ground) calcium carbonate-comprising filler material and a treatment layer comprising at least one mono-substituted succinic anhydride and/or at least one mono-substituted succinic acid and/or salty reaction product(s) thereof. The treatment layer is formed on the surface of said at least one ground (especially wet ground) calcium carbonate-comprising filler material.

In case the treatment layer on the surface of the at least one ground (especially wet ground) calcium carbonate-comprising filler material comprises at least one mono-substituted succinic acid, it is preferred that the at least one mono-substituted succinic acid is formed from the applied at least one mono-substituted succinic anhydride. That is to say, the substituent of the at least one mono-substituted succinic acid and the substituent of the at least one mono-substituted succinic anhydride are the same.

Additionally or alternatively, the at least one mono-substituted succinic acid is provided in a blend together with the at least one mono-substituted succinic anhydride.

In one embodiment of the present invention, the treatment layer formed on the surface of the at least one ground (especially wet ground) calcium carbonate-comprising filler material comprises the at least one mono-substituted succinic anhydride and at least one mono-substituted succinic acid or salty reaction product(s) thereof obtained from contacting the at least one ground (especially wet ground) calcium carbonate-comprising filler material with the at least one mono-substituted succinic anhydride and the optional at least one mono-substituted succinic acid. Alternatively, the treatment layer formed on the surface of the at least one ground (especially wet ground) calcium carbonate-comprising filler material comprises the at least one mono-substituted succinic anhydride and at least one mono-substituted succinic acid and salty reaction product(s) thereof obtained from contacting the at least one ground (especially wet ground) calcium carbonate-comprising filler material with the at least one mono-substituted succinic anhydride and the optional at least one mono-substituted succinic acid.

It is one requirement of the present invention that the surface-treated filler material product comprises the treatment layer in an amount from 0.1 to 3 wt.-%, based on the total dry weight of the at least one ground (especially wet ground) calcium carbonate-comprising filler material.

According to one embodiment the surface-treated filler material product comprises the treatment layer in an amount of from 0.1 to 2.5 wt.-%, preferably in an amount of from 0.1 to 2 wt.-%, more preferably in an amount of from 0.1 to 1.5 wt.-%, even more preferably in an amount of from 0.1 to 1 wt.-% and most preferably in an amount of from 0.2 to 0.8 wt.-% based on the total dry weight of the at least one ground (especially wet ground) calcium carbonate-comprising filler material.

The treatment layer is preferably characterized in that the total weight of the at least one mono-substituted succinic anhydride and/or at least one mono-substituted succinic acid and/or salty reaction product(s) thereof on the surface of the surface-treated filler material product is from 0.05 to 1 wt.-%/m², more preferably from 0.1 to 0.5 wt.-%/m² and most preferably from 0.15 to 0.25 wt.-%/m² of the at least one ground (especially wet ground) calcium carbonate-comprising filler material.

In one embodiment of the present invention, the treatment layer is characterized in that the total weight of the at least one mono-substituted succinic anhydride and/or mono-substituted succinic acid and/or salty reaction product(s) thereof and the optional at least one organic material on the surface of the surface-treated filler material product is from 0.1 to 5 mg/m², more preferably from 0.25 to 4.5 mg/m² and most preferably from 1.0 to 4.0 mg/m² of the at least one calcium carbonate-comprising material.

Additionally or alternatively, the treatment layer of the surface-treated filler material product comprises the at least one mono-substituted succinic anhydride and the at least one mono-substituted succinic acid and/or salty reaction product(s) thereof in a specific molar ratio. For example, the molar ratio of the at least one mono-substituted succinic anhydride and the at least one mono-substituted succinic acid to the salty reaction product(s) thereof is from 99.9:0.1 to 0.1:99.9, preferably from 70:30 to 90:10.

The wording "molar ratio of the at least one mono-substituted succinic anhydride and the at least one mono-substituted succinic acid to the salty reaction product(s) thereof" in the meaning of the present invention refers to the sum of the molecular weight of the at least one mono-substituted succinic anhydride and the sum of the molecular weight of the at least one mono-substituted succinic acid to the sum of the molecular weight of the mono-substituted succinic anhydride molecules in the salty reaction products thereof and the sum of the molecular weight of the mono-substituted succinic acid molecules in the salty reaction products thereof.

The surface-treated filler material product according to the present invention has excellent surface characteristics in comparison to mineral fillers treated with fatty acids and/or fatty acid salts having at least 10 chain carbon atoms, i.e. without the implementation of the at least one mono-substituted succinic anhydride and the optional at least one mono-substituted succinic acid.

In particular, it is appreciated that the surface-treated filler material product features a volatile onset temperature $\geq 250°$ C. For example, the surface-treated filler material product obtained by the inventive process features a volatile onset temperature $\geq 260°$ C. or $\geq 270°$ C.

Additionally or alternatively, the surface-treated filler material product features a total volatiles between 25 and 350° C. of less than 0.25%, and preferably of less than 0.23% by mass, e.g. of from 0.04 to 0.21% by mass, preferably from 0.08 to 0.15% by mass, more preferably from 0.1 to 0.12% by mass.

Furthermore, the surface-treated filler material product features a low water pick up susceptibility. It is preferred that the moisture pick up susceptibility of the surface-treated filler material product is such that its total surface moisture level is less than 1 mg/g of dry calcium carbonate-comprising filler material, at a temperature of about +23° C. (±2° C.). For example, the surface-treated filler material product has a moisture pick up susceptibility of from 0.1 to 1 mg/g, more preferably of from 0.2 to 0.9 mg/g and most preferably of from 0.2 to 0.8 mg/g of dry calcium carbonate-comprising material after at a temperature of +23 C (±2° C.).

Additionally or alternatively, the surface-treated filler material product has a hydrophilicity of below 8:2 volumetric ratio of water:ethanol measured at +23° C. (±2° C.) with the sedimentation method. For example, the surface-treated filler material product has a hydrophilicity of below 7:3 volumetric ratio of water:ethanol measured at +23° C. (±2° C.) with the sedimentation method.

Methods for preparing the surface-treated filler material product are described in WO 2014/060286 A1.

According to one embodiment the breathable film comprises the surface-treated filler material product in an amount from 1 to 85 wt.-%, based on the total weight of the breathable film, preferably from 2 to 80 wt.-%, more preferably from 5 to 75 wt.-%, even more preferably from 10 to 65 wt.-%, and most preferably from 15 wt.-% to 60 wt.-%.

According to one aspect of the present invention, the surface-treated filler material product described above is used as filler in a breathable film.

Breathable Film

According to the present invention a breathable film comprising at least one thermoplastic polymer and a surface-treated filler material product is provided, wherein the surface-treated filler material product comprises A) at least one ground (especially wet ground) calcium carbonate-comprising filler material having
   a weight median particle size $d_{50}$ in the range from 0.1 μm to 7 μm,
   a top cut particle size $d_{98}$ of $\leq 15$ μm, a specific surface area (BET) from 0.5 to 150 m²/g, as measured using nitrogen and the BET method according to ISO 9277, and a residual total moisture content of ≤1 wt.-%, based on the total dry weight of the at least one ground calcium carbonate-comprising filler material, and B) a treatment layer on the surface of the at least one ground calcium carbonate-comprising filler material comprising at least one mono-substituted succinic anhydride and/or at least one mono-substituted succinic acid and/or salty reaction product(s) thereof, wherein the surface-treated filler material product comprises the treatment layer in an amount of from 0.1 to 3 wt.-%, based on the total dry weight of the at least one ground calcium carbonate-comprising filler material.

There are no particular restrictions regarding the thickness of the breathable film of the present invention. The skilled person will tailor the film thickness in accordance with the envisaged application area and the film properties. According to one embodiment, the thickness of the breathable film is from 5 to 100 μm, preferably from 10 to 70 μm.

According to one embodiment the breathable film has a basis weight from 5 to 50 g/m², preferably from 10 to 40 g/m², and more preferably from 10 to 30 g/m².

The breathability of the breathable film can be measured by its water vapour transmission rate. According to one embodiment the breathable film has a water vapour transmission rate (WVTR) from 500 to 10000 g/(m²·day), preferably from 750 to 8000 g/(m²·day), and more preferably from 1000 to 7000 g/(m²·day), measured with a Lyssy L80-5000 measuring device according to ASTM 398.

According to one embodiment the breathable film has a hydrostatic pressure from 100 to 500 mbar, preferably from 200 to 400 mbar, and more preferably from 250 to 350 mbar, measured with a FX 3000 Hydrotester according to the method which has been described above.

According to one embodiment the breathable film further comprises additives selected from the group consisting of UV-absorbers, light stabilizers, processing stabilizers, antioxidants, heat stabilizers, nucleating agents, metal deactivators, impact modifiers, plasticizers, lubricants, rheology modifiers, processing aids, pigments, dyes, optical brighteners, antimicrobials, antistatic agents, slip agents, anti block agents, coupling agents, dispersants, compatibilizers, oxygen scavengers, acid scavengers, markers, antifogging agents, surface modifiers, flame retardants, blowing agents, smoke suppressors, reinforcement agents, such as glass fibres, carbon fibres and/or glass bubbles, or mixtures of the foregoing additives.

Preferably, the additives are selected from the class of acid scavengers based on salts of long chain carboxylic acids, such as calcium stearate, magnesium stearate, zinc stearate, and calcium lactate, or may be hydrotalcite, from the class of stabilizers based on phenolic antioxidants, benzofuranones, hydroxylamines, nitrones, thiosynergists, and phosphites/phosphonites, from the class of light stabilizers based on hindered amines (HALS), from the class of metal deactivators, from the class of dispersing agents, coupling agents, or compatibilizers, or a mixture of any of the foregoing additives.

Suitable phenolic antioxidants are, for example: Octadecyl-3-(3,5-di-tert-butyl-4-hydroxyphenyl)propanonate, pentaerythritol-tetrakis[3-(3,5-di-tert-butyl-4-hydroxyphenyl) propanoate, tris(3,5-di-tert-butyl-4-hydroxyphenyl) isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl)propanoate, N,N'-hexane-1,6-diyl-bis[3-(3,5-di-tert-butyl-4-hydroxyphenyl) propanamide Suitable phosphites/phosphonites are, for example: Tris-(2,4-di-tertbutylphenyl)-phosphite, 3, 9-bis(2,4-di-tert-butylphenoxy)-2,4,8,10-tetraoxa-3,9-diphospha-spiro[5.5]undecene, tetrakis(2,4-di-tert-butylphenyl)[1,1-biphenyl]-4,4'-diylbisphosphonite.

Suitable sterically hindered amines are, for example: 1,1-Bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris (2,2,6,6-tetramethyl-4-piperidyl)-nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinon), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro[4.5]decene and epichlorohydrine.

Suitable dispersants are, for example: Polyacrylates, such as copolymers with long side chains, and polyacrylate block copolymers; alkylamides, such as N,N'-1,2-ethanediylbisoctadecaneamide; sorbitan esters, such as monostearylsorbitan ester; titanates and zirconates; reactive copolymers, such as polypropylene-acrylic acid copolymer; polypropylene-maleic anhydride copolymer; polyethylene-glycidyl-methacrylate copolymer; polystyrol-maleic anhydride-polysiloxane alternating copolymer, such as dimethylsilanediol-ethyleneoxide copolymer; polyphenylsiloxan copolymer; amphiphilic copolymers, such as polyethylene-polyethyleneoxide block copolymer; and dendrimers, such as hydroxy containing dendrimers.

A suitable metal deactivator may be, for example, N,N'-bis(3,5-di-tert-butyl-4-hydroxyphenylpropionyl)hydrazine. According to another embodiment, the metal deactivator may be selected from one or more of the following structures:

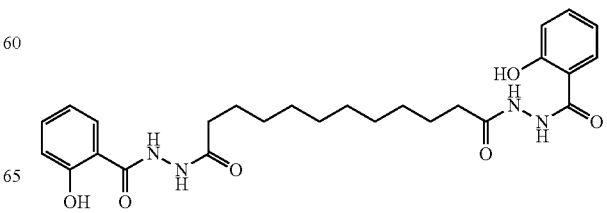

-continued

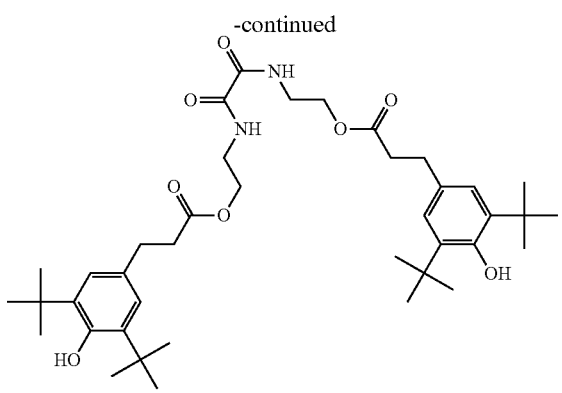

According to a preferred embodiment the breathable film comprises at least one thermoplastic polymer and a surface-treated filler material product, wherein the surface-treated filler material product comprises
A) at least one ground (especially wet ground) calcium carbonate, preferably natural ground calcium carbonate, having
a weight median particle size $d_{50}$ in the range from 0.25 µm to 5 µm, preferably from 0.7 to 4 µm,
a top cut particle size $d_{98}$ of ≤10 µm, preferably of ≤7.5 µm,
a specific surface area (BET) from 0.5 to 35 m$^2$/g, preferably from 0.5 to 15 m$^2$/g as measured using nitrogen and the BET method according to ISO 9277, and
a residual total moisture content from 0.01 to 0.2 wt.-%, preferably from 0.02 to 0.15 wt.-%, based on the total dry weight of the at least one ground calcium carbonate-comprising filler material, and
B) a treatment layer on the surface of the at least one ground calcium carbonate-comprising filler material comprising at least one mono-substituted succinic anhydride and/or at least one mono-substituted succinic acid and/or salty reaction product(s) thereof,
wherein the surface-treated filler material product comprises the treatment layer in an amount of from 0.1 to 1 wt.-%, preferably from 0.2 to 0.08 wt.-%, based on the total dry weight of the at least one ground calcium carbonate-comprising filler material.

The breathable film of the present invention may be produced by any method known in the art. According to one embodiment, a process of producing a breathable film comprises the steps of:
a) providing a composition comprising at least one thermoplastic polymer and a surface-treated filler material product, and
b) forming a film from the composition of step a), and
c) stretching the film obtained in step b) into at least one direction,
wherein the surface-treated filler material product comprises
A) at least one ground (especially wet ground) calcium carbonate-comprising filler material having
a weight median particle size $d_{50}$ in the range from 0.1 µm to 7 µm,
a top cut particle size $d_{98}$ of ≤15 µm,
a specific surface area (BET) from 0.5 to 150 m$^2$/g, as measured using nitrogen and the BET method according to ISO 9277, and
a residual total moisture content of ≤1 wt.-%, based on the total dry weight of the at least one ground calcium carbonate-comprising filler material, and
B) a treatment layer on the surface of the at least one ground calcium carbonate-comprising filler material comprising at least one mono-substituted succinic anhydride and/or at least one mono-substituted succinic acid and/or salty reaction product(s) thereof,
wherein the surface-treated filler material product comprises the treatment layer in an amount of from 0.1 to 3 wt.-%, based on the total dry weight of the at least one ground calcium carbonate-comprising filler material.

The composition of the at least one thermoplastic polymer and the surface-treated filler material product provided in process step a) can be produced by mixing or compounding said components. The at least one thermoplastic polymer and the surface-treated filler material product, and, if present, other optional additives, may be mixed by the use of a suitable mixer, e.g. a Henschel mixer, a super mixer, a tumbler type mixer or the like. The compounding step may be done with a suitable extruder, preferably by a twin screw extruder (co- or counter-rotating) or by any other suitable continuous compounding equipment, e.g. a continuous co-kneader (Buss), a continuous mixer (Farrel Pomini), a ring extruder (Extricom) or the like. The continuous polymer mass from extrusion may be either pelletized by (hot cut) die face pelletizing with underwater pelletizing, eccentric pelletizing and water ring pelletizing or by (cold cut) strand pelletizing with underwater and conventional strand pelletizing to form the extruded polymer mass into pellets.

Optionally, the compounding step may also be performed with a discontinuous or batch process using an internal (batch) mixer, e.g. a Banburry mixer (HF Mixing Group) or a Brabender mixer (Brabender) or the like.

According to an optional embodiment, the composition provided in process step a) further comprises one or more of the additives described above.

According to one embodiment the composition provided in process step a) is a masterbatch. According to a preferred embodiment the masterbatch comprises the surface-treated filler material product in an amount of from 50 to 85 wt.-%, preferably from 60 to 85 wt.-% and more preferably from 70 to 80 wt.-%, based on the total weight of the masterbatch. The masterbatch may be in form of pellets, beads, or granules.

According to one embodiment of the present invention the composition provided in step a) is a masterbatch or a compound obtained by mixing and/or kneading the at least one thermoplastic polymer and the surface-treated filler material product to form a mixture and continuously pelletizing the obtained mixture under water. Continuously means at least 8 hours, preferably at least 24 hours and more preferably more than 170 hours without interruption.

The inventors of the present invention surprisingly found that the use of the surface-treated filler material product of the present invention can avoid the problem of foaming in the water bath during the production of a masterbatch or a compound, which can lead to an interruption of the production process causing a reduced output rate. Thus, the surface-treated filler material product of the present invention can allow the continuous production of masterbatches and compounds, and thereby increases the efficiency of the masterbatch and compound production for breathable films.

The risk of leaching of the surface coating, especially when in contact with human skin, is minimized with the inventive surface coating. Therefore, by using the surface-treated filler material product of the present invention, a breathable film with a reduced potential of skin irritation can be produced.

A filter pressure test was carried out in order to determine the dispersion quality. The filter pressure test was performed on a commercially available Collin Pressure Filter Test Teach-Line FT-E20T-IS. The test method was performed in agreement with European Standard EN 13900-5 with each of the corresponding polymer compositions (16 g effective calcium carbonate per 200 g of final sample, diluent: LLDPE ExxonMobil LL 1001 VX) using a 14 μm type 30 filter (GKD Gebr. Kufferath AG, Düren, Germany), wherein no melt pump was used, the extruder speed was kept at 100 rpm, and wherein the melt temperature was 225 to 230° C. (temperature setting: 190° C./210° C./230° C./230° C./230° C.).

The inventors of the present invention found that the use of the surface-treated filler material product of the present invention in breathable films may result in a very finely and homogenously filled breathable film material. Without being bound to any theory it is believed that the specific properties of the surface-treated filler material product according to the present invention may render it especially suitable for application in breathable films, which require to have the fillers as equally distributed through the film as possible, in order to obtain a uniform distribution barrier and vapour transmission properties throughout the film.

The masterbatch may be used directly in process step b) or may be mixed with one or more thermoplastic polymers before process step b). The masterbatch can also be mixed with one or more of the additives described above. According to a preferred embodiment, the masterbatch is used directly in process step b).

The process step b) may be carried out by any well-known techniques used for preparing polymer films. Examples of suitable film extrusion techniques are blown film extrusion or cast film extrusion.

In process step c) the film obtained in process step b) is stretched into at least one direction. During the stretching step the polymer may be delaminated from the surface of the surface-treated filler material product, whereby pores can be formed in the breathable film. The stretching step c) may be carried out by any means known in the art.

The film can be stretched in at least a uniaxial direction at a temperature of from room temperature to the softening point of the thermoplastic polymer by well-known techniques such as a roll method, an interdigitizing method, or a tenter method.

According to one embodiment, in process step c) the film obtained in step b) is stretched by machine direction orientation (MDO). As known to the skilled person, the MDO process consists of a series of stages such as preheating, orienting, annealing and cooling. Typically, the film enters the MDO and is preheated to the required orientation temperature. In the orienting stage, the film is nipped between a slow and a fast, rotating roller. Depending on the desired film properties, the film can be quenched or annealed after orientation. In the final stage, the film may be cooled to near ambient temperature.

The stretching may be carried out by one step or by several steps. According to one embodiment process step c) is carried out from 1 to 10 times.

Stretch magnification determines film breakage at high stretching as well as breathability and the water vapour transmission of the obtained film, and so excessively high stretch magnification and excessively low stretch magnification are desirably avoided. According to one embodiment, in process step c), the film obtained in step b) is stretched to a stretch magnification from 1.2 to 6 times, more preferably 1.2 to 4 times into at least one direction.

According to one embodiment in step c) of the inventive process, the film obtained in step b) is stretched in two directions. If biaxial stretching is carried out, it is possible that for example stretching in a first direction is applied in the machine direction or a direction perpendicular thereto, and stretching in a second direction is then applied at right angles to the first direction. Alternatively, the biaxial stretching may be carried out simultaneously in the machine direction and the direction perpendicular thereto.

According to one embodiment process step c) is carried out at a temperature of about 30 to 160° C., preferably from 40 to 130° C., more preferably from 45 to 80° C., and most preferably from 50 to 70° C.

After the stretching, a heat setting treatment may be carried out if required in order to stabilize the structure of the breathable film. The heat setting treatment may be, for example, a heat setting treatment at a temperature in the range of from the softening point of the polymer to a temperature less than about the melting point of the polymer for a period of 0.1 to 100 s.

The inventors of the present invention found that the breathable film according to the present invention retains good breathability and low film defect levels. Furthermore, the breathable film may provide good colour properties and good processing characteristics such as low die build-up properties and merely a low pressure increase during the extrusion is observed. The inventors of the present invention also found that the breathable film may have a reduced potential of skin irritation, for example, if the breathable film is in direct contact with skin, and especially moist or wet skin. Therefore, the inventive breathable film may be especially suitable for hygiene products such as baby diapers, adult incontinence products, or wound dressings.

The breathable film according to the present invention can be used in many different applications. According to one embodiment, the breathable film is used in hygienic applications, medical applications, healthcare applications, filtration materials, geotextile products, agricultural applications, horticultural applications, clothing, footwear products, baggage products, household applications, industrial applications, packaging applications, building applications, or construction.

According to a further aspect of the present invention, an article comprising a breathable film according to the present invention is provided, wherein the article is selected from the group consisting of hygiene products, medical products, healthcare products, filter products, geotextile products, agriculture products, horticulture products, clothing, footwear products, baggage products, household products, industrial products, packaging products, building products, and construction products.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like.

Preferably, the building and construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

The scope and interest of the invention will be better understood based on the following examples which are intended to illustrate certain embodiments of the present invention and are non-limitative.

EXAMPLES

1. Measurement Methods and Materials

In the following, measurement methods and materials implemented in the examples are described.

Residual Moisture Content of the Surface-treated Filler

The residual total moisture content of the surface-treated filler material products was measured according to the Karl Fischer Coulometric titration method, desorbing the moisture in an oven at 220° C. and passing it continuously into the KF Coulometer (Mettler Toledo Coulometric KF Titrator C30, combined with Mettler oven DO 0337) using dry $N_2$ at 100 ml/min for 10 min. A calibration curve using water was prepared and a blind of 10 min gas flow without a sample was taken into account.

Moisture Pick-up

The term "moisture pick-up susceptibility" in the meaning of the present invention refers to the amount of moisture absorbed on the surface of the mineral filler and is determined in mg moisture/g of the dry treated mineral filler product after exposure to an atmosphere of 10 and 85% of relative humidity, resp., for 2.5 hours at a temperature of +23° C. (±2° C.) (measuring equipment: Gintronic GraviTest Model 6300, Gintronic AG, Switzerland). The treated mineral filler product is first held at an atmosphere of 10% of relative humidity for 2.5 hours, then the atmosphere is changed to 85% of relative humidity, where the sample is held for another 2.5 hours. The weight increase between 10% and 85% relative humidity is then used to calculate the moisture pick-up in mg moisture/g of dry treated mineral filler product.

Particle Size

The particle distribution of the untreated ground calcium carbonate-comprising filler material was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Specific Surface Area (BET)

The specific surface area was measured using nitrogen and the BET method according to ISO 9277.

Ash Content

The ash content in [%] of the masterbatches was determined by incineration of a sample in an incineration crucible which is put into an incineration furnace at 570° C. for 2 hours. The ash content is measured as the total amount of remaining inorganic residues.

Filter Pressure Test

A filter pressure test was carried out in order to determine the dispersion quality. The filter pressure test was performed on a commercially available Collin Pressure Filter Test Teach-Line FT-E20T-IS. The test method was performed in agreement with European Standard EN 13900-5 with each of the corresponding polymer compositions (16 g effective calcium carbonate per 200 g of final sample, diluent: LLDPE ExxonMobil LL 1001 VX) using a 14 μm type 30 filter (GKD Gebr. Kufferath AG, Düren, Germany), wherein no melt pump was used, the extruder speed was kept at 100 rpm, and wherein the melt temperature was 225 to 230° C. (temperature setting: 190° C./210° C./230° C./230° C./230° C.).

Water Vapour Transmission Rate (WVTR)

The WVTR value of the breathable films was measured with a Lyssy L80-5000 (PBI-Dansensor A/S, Denmark) measuring device according to ASTM E398.

Hydrostatic Pressure Test

The hydrostatic pressure test has been carried out according to a procedure which is equivalent to AATCC Test Method 127-2013, WSP 80.6 and ISO 811. A film sample (test area=10 cm$^2$) was mounted to form a cover on the test head reservoir. This film sample was subjected to a standardized water pressure, increased at a constant rate until leakage appears on the outer surface of the film, or water burst occured as a result of film failure (pressure rate gradient=100 mbar/min.). Water pressure was measured as the hydrostatic head height reached at the first sign of leakage in three separate areas of the film sample or when burst occurs. The head height results were recorded in centimeters or millibars of water pressure on the specimen. A higher value indicated greater resistance to water penetration. The TEXTEST FX-3000, Hydrostatic Head Tester (Textest AG, Switzerland), was used for the hydrostatic pressure measurements.

Assessment of Foaming Properties

The foaming properties of the prepared masterbatches were examined visually. (+) means that foam formation in the water bath was observed after 168 h of pelletization, while (−) means that no foam formation in the water bath was observed after 168 h of pelletization.

Melt Flow Rate (MFR)

Melt flow rate of the masterbatches has been determined according to ISO 1133 (190° C., 5 kg).

2. Materials

CC1 (comparative): Natural ground calcium carbonate, commercially available from Omya International AG, Switzerland ($d_{50}$: 1.7 µm; $d_{98}$: 6 µm), surface-treated with 0.55 wt.-% octanoic acid (product number 00040, commercially available from TCI Europe N.V, Belgium) based on the total weight of the natural ground calcium carbonate. BET: 3.4 g/m², residual moisture content: 0.1 wt.-%, moisture pick-up: 0.41 mg/g.

CC2 (inventive): Natural ground calcium carbonate, commercially available from Omya International AG, Switzerland ($d_{50}$: 1.7 µm; $d_{98}$: 6 µm), surface-treated with 0.7 wt. % alkenyl succinic anhydride (CAS [68784-12-3], concentration >93%) based on the total weight of the natural ground calcium carbonate. BET: 3.4 g/m², residual moisture content: 0.1 wt.-%, moisture pick-up: 0.58 mg/g.

CC3 (inventive): Natural ground calcium carbonate, commercially available from Omya International AG, Switzerland ($d_{50}$: 1.7 µm; $d_{98}$: 6 µm), first surface-treated with 0.7 wt. % alkenyl succinic anhydride (CAS [68784-12-3], concentration >93%) based on the total weight of the natural ground calcium carbonate and then surface-treated with 0.05 wt.-% polydimethylsiloxane (CAS [63148-62-9], kinematic viscosity=1000 cSt), BET: 3.4 g/m², residual moisture content: 0.1 wt.-%, moisture pick-up: 0.46 mg/g.

P1: LLDPE Dowlex 2035 (MFR: 6 g/10 min (190° C., 2.16 kg), density: 0.919 g/cm³ according to technical data sheet), commercially available from The Dow Chemical Company, USA.

P2: LDPE Dow SC 7641 (MFR: 2 g/10 min (190° C., 2.16 kg), density: 0.923 g/cm³ according to technical data sheet), commercially available from The Dow Chemical Company, USA.

3. Examples

Example 1

Preparation of Compounds (CO)

Compounds containing 45 wt.-% P1, 5 wt.-% P2, and 50 wt.-% CC1 (comparative), CC2 (inventive) or CC3 (inventive), respectively, were continuously prepared on a lab scale Buss kneader (PR46 from Buss AG, Switzerland). The obtained compounds were pelletized on a spring load pelletizer, model SLC (Gala, USA) in a water bath having a starting temperature between 20 and 25° C. The compositions and filler contents of the prepared compounds are compiled in Table 1 below. The precise filler content was determined by the ash content. Furthermore, a filter pressure test was carried out in order to determine the dispersion quality of the filler material product.

TABLE 1

Compositions and properties of prepared compounds.

| Masterbatch | Filler | Ash content [wt.-%] | MFR (190° C., 5 kg) ISO 1133 | FPV at 14 µm |
|---|---|---|---|---|
| CO1 (comparative) | CC1 | 50.8 | 10.5 g/10 min | 0.62 bar/g |
| CO2 (inventive) | CC2 | 50.5 | 12.5 g/10 min | 0.44 bar/g |
| CO3 (inventive) | CC3 | 49.4 | 11.2 g/10 min | 0.34 bar/g |

The results shown in Table 1 confirm that compounds with good quality were produced. Furthermore, the filter pressure test revealed that the filler material product of the present invention shows an improved dispersion quality in a breathable film composition, compared to the prior art filler material product.

Example 2

Preparation of Breathable Films

Breathable films were produced by a pilot-extrusion cast-film line with integrated MDO-II unit (Dr. Collin GmbH, Germany) the extruder temperature settings were 195° C.-210° C.-230° C.-230° C., and the rotation speed of the extruder was approximately 35 rpm using the compounds of Example 1. The roller speed of the stretching unit was 125/125%.

The film quality of the obtained breathable films was inspected visually and the films were tested regarding their water vapour transmission rate (WVTR) and their hydrostatic pressure. The results are shown in Table 2 below.

TABLE 2

Compositions and properties of prepared breathable films.

| Sample | Compound | Film quality | WVTR | Hydrostatic pressure |
|---|---|---|---|---|
| 1 (comparative) | CO1 | ok | 4300 g/(m² × day) | 327 mbar |
| 2 (inventive) | CO2 | ok | 4353 g/(m² × day) | 323 mbar |
| 3 (inventive) | CO3 | ok | 4512 g/(m² × day) | 360 mbar |

The results shown in Table 2 confirm that the inventive breathable film has a good quality and breathability, which is similar to that of the comparative breathable film.

Example 3

Foam Formation During Continuous Compound Production

Compounds containing 45 wt.-% P1, 5 wt.-% P2, and 50 wt.-% CC1 (comparative) or CC2 (inventive), respectively, were continuously prepared for 168 h on a lab scale Buss kneader (PR46 from Buss AG, Switzerland). The obtained compounds were pelletized on a spring load pelletizer, model SLC (Gala, USA) in a water bath having a starting temperature between 20 and 25° C.

As can be gathered from the results given in Table 3 below, during the continuous production of the compounds including the inventive surface-treated filler material no foam formation in the water bath has been observed after 168 h. In contrast, during the preparation of the compounds including the comparative filler material a heavy foam formation in the water bath has been observed after 168 h.

TABLE 3

Foam formation during the continuous preparation of the compounds.

| Sample | Compound | foaming |
|---|---|---|
| 1 (comparative) | CO1 | (+) |
| 2 (inventive) | CO2 | (−) |
| 3 (inventive) | CO3 | (−) |

The invention claimed is:

1. A breathable film comprising at least one thermoplastic polymer and a surface-treated filler material product, wherein the surface-treated filler material product comprises:
   A) at least one ground calcium carbonate-comprising filler material having:
      a weight median particle size $d_{50}$ in the range from 0.1 µm to 7 µm, a top cut particle size $d_{98}$ of less than or equal to 15 μm,
a specific surface area (BET) from 0.5 to 150 m²/g, as measured using nitrogen and the BET method according to ISO 9277, and
a residual total moisture content of less than or equal to 1 wt.-%, based on the total dry weight of the at least one ground calcium carbonate-comprising filler material, and
B) a treatment layer on the surface of the at least one ground calcium carbonate-comprising filler material comprising at least one mono-substituted succinic anhydride and/or at least one mono-substituted succinic, acid and/or salty reaction product(s) thereof,
wherein the surface-treated filler material product comprises the treatment layer in an amount of from 0.1 to 3 wt.-%, based on the total dry weight of the at least one ground calcium carbonate-comprising filler material,
wherein the breathable film comprises 2 to 80 wt.-% of the surface-treated filler material product, based on the total weight of the breathable film, and 15 to 70 wt.-% of the at least one thermoplastic polymer, based on the total weight of the breathable film, and
wherein the breathable film has a water vapour transmission rate (WVTR) from 500 to 10,000 g/m²·day), measured according to ASTM 398.

2. The breathable film of claim 1, wherein the at least one ground calcium carbonate-comprising filler material is a wet ground calcium carbonate-comprising filler material.

3. The breathable film of claim 1, wherein the at least one thermoplastic polymer is a polyolefin.

4. The breathable film of claim 1, wherein the at least one thermoplastic polymer is a polyolefin selected from the group consisting of polypropylene, polyethylene, polybutylene, and any mixture thereof.

5. The breathable film of claim 1, wherein the at least one thermoplastic polymer is selected from the group consisting of high density polyethylene (HDPE), linear low density polyethylene (LLDPE), low density polyethylene (LDPE), ultra-low density polyethylene (ULDPE), very low density polyethylene (VLDPE), and any mixture thereof.

6. The breathable film of claim 1, wherein the breathable film comprises the surface-treated filler material product in an amount from 5 to 75 wt.-%, based on the total weight of the breathable film.

7. The breathable film of claim 1, wherein the breathable film comprises the surface-treated filler material product in an amount from 10 to 65 wt.-%, based on the total weight of the breathable film.

8. The breathable film of claim 1, wherein the at least one ground calcium carbonate-comprising filler material is selected from the group consisting of natural ground calcium carbonate, precipitated calcium carbonate, modified calcium carbonate, surface-treated calcium carbonate, and any mixture thereof.

9. The breathable film of claim 1, wherein the at least one ground calcium carbonate-comprising filler material has a weight median particle size $d_{50}$ from 0.25 μm to 5 μm.

10. The breathable film of claim 1, wherein the at least one ground calcium carbonate-comprising filler material has a top cut particle size $d_{98}$ of less than or equal to 12.5 μm.

11. The breathable film of claim 1, wherein the at least one ground calcium carbonate-comprising filler material has a specific surface area (BET) of from 0.5 to 50 m²/g, as measured using nitrogen and the BET method according to ISO 9277.

12. The breathable film of claim 1, wherein the at least one ground calcium carbonate-comprising filler material has a residual total moisture content of from 0.01 to 0.2 wt.-%, based on the total dry weight of the at least one ground calcium carbonate-comprising filler material.

13. The breathable film of claim 1, wherein the at least one ground calcium carbonate-comprising filler material has a residual total moisture content of from 0.04 to 0.15 wt.-%, based on the total dry weight of the at least one ground calcium carbonate-comprising filler material.

14. The breathable film of claim 1, wherein the at least one mono-substituted succinic anhydride consists of succinic anhydride mono-substituted with a group selected from a linear, branched, aliphatic and cyclic group having a total amount of carbon atoms from C2 to C30 in the substituent.

15. The breathable film of claim 1, wherein the at least one mono-substituted succinic anhydride consists of succinic anhydride mono-substituted with a group selected from a linear, branched, aliphatic and cyclic group having a total amount of carbon atoms from C4 to C20 in the substituent.

16. The breathable film of claim 1, wherein the surface-treated filler material product has a moisture pick-up from 0.1 to 1 mg/g, at a temperature of 23° C. (±2° C.).

17. The breathable film of claim 1, wherein the surface-treated filler material product has a moisture pick-up from 0.2 to 0.8 mg/g, at a temperature of 23° C. (±2° C.).

18. The breathable film of claim 1, wherein the surface-treated filler material product has a volatile onset temperature of greater than or equal to 250° C.

19. The breathable film of claim 1, wherein the surface-treated filler material product has a volatile onset temperature of greater than or equal to 270° C.

20. The breathable film of claim 1, wherein the treatment layer on the surface of the at least one ground calcium carbonate-comprising filler material comprises at least one mono-substituted succinic anhydride and/or at least one mono-substituted succinic acid and/or salty reaction product(s) and at least one polydialkylsiloxane selected from the group consisting of polydimethylsiloxane, polydiethylsiloxane, polymethylphenylsiloxane, and mixtures thereof.

21. The breathable film of claim 1, wherein the at least one ground calcium carbonate-comprising filler material comprises a treatment layer comprising at least one mono-substituted succinic anhydride and/or at least one mono-substituted succinic acid and/or salty reaction product(s), and an after treatment layer comprising at least one polydialkylsiloxane from the group consisting of polydimethylsiloxane, polydiethylsiloxane, polymethylphenylsiloxane and/or mixtures thereof.

22. A process for producing the breathable film of claim 1, comprising the steps of:
   a) providing a composition comprising at least one thermoplastic polymer and a surface-treated filler material product,
   b) forming a film from the composition of step a), and
   c) stretching the film obtained in step b) into at least one direction, wherein the surface-treated filler material product comprises:
   A) at least one ground calcium carbonate-comprising filler material having
      a weight median particle size $d_{50}$ in the range from 0.1 μm to 7 μm,
      a top cut particle size $d_{98}$ of less than or equal to 15 μm,
      a specific surface area (BET) from 0.5 to 150 m²/g, as measured using nitrogen and the BET method according to ISO 9277, and a residual total moisture content of less than or equal to 1 wt.-%, based on the total dry weight of the at least one ground calcium carbonate-comprising filler material, and B) a treatment layer on the surface of the at least one wet ground calcium carbonate-comprising filler material comprising at least one mono-substituted succinic anhydride and/or at least one mono-substituted succinic acid and/or salty reaction product(s) thereof, wherein the surface-treated filler material product comprises the treatment layer in an amount of from 0.1 to 3 wt.-%, based on the total dry weight of the at least one ground calcium carbonate-comprising filler material, wherein the breathable film comprises 2 to 80 wt.-% of the surface-treated filler material product, based on the total weight of the breathable film, and 15 to 70 wt.-% of the at least one thermoplastic polymer, based on the total weight of the breathable film, and wherein the breathable film has a water vapour transmission rate (WVTR) from 500 to 10,000 g/m$^2$·day, measured according to ASTM 398.

23. The process of claim 22, wherein the composition provided in step a) is a masterbatch or a compound obtained by mixing and/or kneading the at least one thermoplastic polymer and the surface-treated filler material product to form a mixture and continuously pelletizing the obtained mixture under water.

24. An article comprising a breathable film of claim 1, wherein the article is selected from the group consisting of hygiene products, medical products, healthcare products, filter products, geotextile products, agriculture products, horticulture products, clothing, footwear products, baggage products, household products, industrial products, packaging products, building products, and construction products.

* * * * *